US010368166B2

(12) United States Patent
Renken et al.

(10) Patent No.: US 10,368,166 B2
(45) Date of Patent: Jul. 30, 2019

(54) VOLTAGE REGULATOR AND CONTROL CIRCUIT FOR SILVER-ZINC BATTERIES IN HEARING INSTRUMENTS

(71) Applicant: ZPower, LLC, Camarillo, CA (US)

(72) Inventors: Troy W. Renken, Alpharetta, GA (US); Don Barrett, Camarillo, CA (US); Timothy W. Powers, Thousand Oaks, CA (US)

(73) Assignee: ZPower, LLC, Camarillo, CA (US)

( * ) Notice: Subject to any disclaimer, the term of this patent is extended or adjusted under 35 U.S.C. 154(b) by 20 days.

(21) Appl. No.: 15/317,988

(22) PCT Filed: Jun. 17, 2015

(86) PCT No.: PCT/US2015/036119
§ 371 (c)(1),
(2) Date: Dec. 12, 2016

(87) PCT Pub. No.: WO2015/195731
PCT Pub. Date: Dec. 23, 2015

(65) Prior Publication Data
US 2017/0118558 A1   Apr. 27, 2017

Related U.S. Application Data

(60) Provisional application No. 62/013,606, filed on Jun. 18, 2014.

(51) Int. Cl.
*H04R 25/00* (2006.01)
*H04R 3/00* (2006.01)
*H01M 10/42* (2006.01)

(52) U.S. Cl.
CPC .............. *H04R 3/007* (2013.01); *H04R 25/30* (2013.01); *H04R 25/305* (2013.01);
(Continued)

(58) Field of Classification Search
CPC ........... H04R 2225/31; H04R 2225/33; H02M 2003/072
See application file for complete search history.

(56) References Cited

U.S. PATENT DOCUMENTS

| 5,237,257 A | 8/1993 | Johnson et al. |
| D354,568 S | 1/1995 | Araki et al. |

(Continued)

FOREIGN PATENT DOCUMENTS

| DE | 19702151 A1 * | 7/1998 | ............. H04R 25/00 |
| EP | 2645745 | 10/2013 | |

(Continued)

OTHER PUBLICATIONS

International Search Report for PCT/US2015/036119 dated Sep. 10, 2015.

(Continued)

*Primary Examiner* — Jesse A Elbin
*Assistant Examiner* — Ryan Robinson
(74) *Attorney, Agent, or Firm* — Honigman LLP; Andrew N. Weber; Jonathan P. O'Brien

(57) ABSTRACT

The present invention provides an apparatus for managing power within a voltage regulating circuit of a battery-powered hearing aid device includes an input terminal of a voltage regulator that receives an input voltage supplied by a battery. An output terminal of the voltage regulator provides an output voltage to a hearing aid terminal that is electrically connected to one or more electrical components of the hearing aid device. A sensing terminal of the voltage regulator senses an electrical connection between the charging device is and charging contacts of the voltage regulating circuit. The voltage regulator is configured to reduce a magnitude of the input voltage when the magnitude of the input voltage exceeds an input voltage threshold to generate (Continued)

the output voltage having a magnitude that is less than a maximum output voltage.

19 Claims, 9 Drawing Sheets

(52) U.S. Cl.
CPC .. *H01M 10/425* (2013.01); *H01M 2010/4271* (2013.01); *H04R 2225/31* (2013.01); *H04R 2225/33* (2013.01); *H04R 2460/03* (2013.01)

(56) References Cited

U.S. PATENT DOCUMENTS

| | | | |
|---|---|---|---|
| D401,552 S | 11/1998 | Tanaka et al. | |
| 6,144,749 A | 11/2000 | Fideler | |
| 6,304,467 B1 * | 10/2001 | Nebrigic | H02J 7/0065 363/49 |
| 6,373,229 B1 * | 4/2002 | Slusky | H02J 7/0042 320/165 |
| D457,635 S | 5/2002 | Dittli | |
| 6,459,243 B1 | 10/2002 | Cheiky et al. | |
| 6,473,511 B1 | 10/2002 | Aceti et al. | |
| 6,522,102 B1 | 2/2003 | Cheiky et al. | |
| 6,546,110 B1 | 4/2003 | Vonlanthen | |
| 6,658,125 B1 | 12/2003 | Batting | |
| 6,741,715 B2 | 5/2004 | Andersen | |
| 6,743,548 B2 | 6/2004 | Cheiky et al. | |
| 6,831,988 B2 * | 12/2004 | Vonlanthen | H04R 25/556 381/314 |
| 6,943,529 B2 | 9/2005 | Cheiky et al. | |
| 6,943,530 B2 | 9/2005 | Cheiky et al. | |
| 7,068,804 B2 | 6/2006 | Batting | |
| 7,076,075 B2 | 7/2006 | Jorgensen | |
| 7,218,076 B2 | 5/2007 | Cheiky et al. | |
| 7,327,850 B2 * | 2/2008 | Crump | H02M 3/156 381/323 |
| 7,382,270 B2 | 6/2008 | Wendelrup et al. | |
| D579,567 S | 10/2008 | Pedersen | |
| D599,908 S | 9/2009 | Nielsen | |
| 7,646,878 B2 | 1/2010 | Vonlanthen et al. | |
| D615,924 S | 5/2010 | McGugan | |
| D622,855 S | 8/2010 | Cano, Jr. | |
| D635,263 S | 3/2011 | Meinertz | |
| 8,027,497 B2 * | 9/2011 | Klemenz | H04R 25/55 381/322 |
| D646,788 S | 10/2011 | Dubs et al. | |
| 8,073,173 B2 | 12/2011 | Onodera | |
| 8,098,862 B2 | 1/2012 | Koch et al. | |
| D663,847 S | 7/2012 | Dubs et al. | |
| D676,559 S | 2/2013 | Meinertz | |
| D676,967 S | 2/2013 | Meinertz | |
| D676,969 S | 2/2013 | Meinertz | |
| D682,429 S | 5/2013 | Campbell et al. | |
| D687,952 S | 8/2013 | Dubs | |
| D690,820 S | 10/2013 | Nielsen | |
| D698,024 S | 1/2014 | Meinertz | |
| D701,604 S | 3/2014 | Dubs | |
| 8,767,990 B2 | 7/2014 | Spragge | |
| 8,903,112 B2 | 12/2014 | Lu et al. | |
| D722,167 S | 2/2015 | Li | |
| D722,168 S | 2/2015 | Darkes | |
| 9,014,407 B2 | 4/2015 | Boguslavskij et al. | |
| 9,071,917 B2 * | 6/2015 | Neumeyer | H04R 25/30 |
| 9,113,276 B2 * | 8/2015 | Kill | H04R 25/602 |
| 9,240,696 B2 | 1/2016 | Renken et al. | |
| D751,079 S | 3/2016 | Skjoldborg | |
| 9,319,811 B2 | 4/2016 | Etwil et al. | |
| D757,944 S | 5/2016 | Bishop | |
| D757,945 S | 5/2016 | Bishop | |
| 9,621,999 B2 * | 4/2017 | Sudan | H04R 25/305 |
| 10,057,695 B2 | 8/2018 | Renken et al. | |
| 2002/0196957 A1 * | 12/2002 | Andersen | H04R 25/505 381/323 |
| 2003/0111979 A1 | 6/2003 | Cheiky et al. | |
| 2004/0178772 A1 | 9/2004 | Cheiky et al. | |
| 2004/0217738 A1 | 11/2004 | Cheiky et al. | |
| 2006/0216596 A1 | 9/2006 | Cheiky et al. | |
| 2007/0047751 A1 | 3/2007 | Heerlein et al. | |
| 2007/0126402 A1 | 6/2007 | Tsai et al. | |
| 2008/0044049 A1 | 2/2008 | Ho et al. | |
| 2008/0240480 A1 | 10/2008 | Pinnell et al. | |
| 2009/0010462 A1 * | 1/2009 | Ekchian | H01M 2/1022 381/312 |
| 2009/0257610 A1 * | 10/2009 | Wu | H04R 25/00 381/323 |
| 2010/0226519 A1 | 9/2010 | Spragge et al. | |
| 2010/0290655 A1 | 11/2010 | Takeda et al. | |
| 2011/0175571 A1 | 7/2011 | Renken et al. | |
| 2011/0200218 A1 | 8/2011 | Borregaard | |
| 2013/0195303 A1 | 8/2013 | Tada | |
| 2013/0207618 A1 | 8/2013 | Renken et al. | |
| 2013/0259278 A1 | 10/2013 | Kill et al. | |
| 2013/0272556 A1 | 10/2013 | Hamacher | |
| 2013/0328524 A1 | 12/2013 | Bartulec et al. | |
| 2013/0329925 A1 * | 12/2013 | Boguslavskij | H04R 25/00 381/323 |
| 2014/0177893 A1 | 6/2014 | Lu et al. | |
| 2015/0188421 A1 * | 7/2015 | Ko | H02M 3/156 323/282 |
| 2015/0249895 A1 | 9/2015 | Etwil et al. | |
| 2015/0326982 A1 | 11/2015 | Sudan | |
| 2015/0357859 A1 | 12/2015 | Pourdarvish et al. | |
| 2016/0073205 A1 | 3/2016 | Kill et al. | |
| 2016/0365751 A1 | 12/2016 | Hatanaka et al. | |
| 2017/0134869 A1 | 5/2017 | Renken et al. | |
| 2017/0188162 A1 | 6/2017 | Flaig et al. | |
| 2018/0123369 A1 | 5/2018 | Pourdarvish et al. | |

FOREIGN PATENT DOCUMENTS

| | | | |
|---|---|---|---|
| GB | 2371376 A * | 7/2002 | G05F 1/613 |
| WO | 2002/089286 | 11/2002 | |
| WO | 2003/052859 | 6/2003 | |
| WO | 2003/052899 | 6/2003 | |
| WO | 2003/061052 | 7/2003 | |
| WO | 2014/008317 | 1/2014 | |
| WO | 2015/195735 | 12/2015 | |

OTHER PUBLICATIONS

International Preliminary Report on Patentability for PCT/US2015/036119 dated Dec. 29, 2016.
International Preliminary Report on Patentability for PCT/US2015/036128 dated Dec. 29, 2016.
International Search Report for PCT/US2015/036128 dated Feb. 10, 2016.
Written Opinion of the ISA for PCT/US2015/036119 dated Sep. 10, 2015.
Written Opinion of the ISA for PCT/US2015/036128 dated Feb. 10, 2016.

* cited by examiner

VOLTAGE REGULATOR AND CONTROL CIRCUIT FOR SILVER-ZINC BATTERIES IN HEARING INSTRUMENTS

CROSS REFERENCE TO RELATED APPLICATION

This U.S. nonprovisional application is the 35 USC § 371 national phase of PCT application no. PCT/US2015/036119, filed on Jun. 17, 2015, which claims priority to U.S. provisional application Ser. No. 62/013,606, filed on Jun. 18, 2014. Each of these documents is hereby incorporated by reference in its entirety.

TECHNICAL FIELD

The present invention relates to battery powered hearing aid devices. More specifically, this invention relates to managing battery voltage for power hearing aid devices.

BACKGROUND

A hearing aid is an electronic device known to alleviate hearing loss of a human. Generally, the hearing aid captures sounds from the environment using one or more microphones and amplifies the captured sounds electrically according to a hearing aid prescription. Digital representations of the amplified signals are converted back into electrical signals suitable for driving an output transducer of the hearing aid for generating sound waves perceivable to its user.

It is known to utilize a battery to power a hearing aid. Zinc-air batteries, while characteristic of a high energy density and relatively inexpensive to produce, are non-rechargeable and must be replaced once they have been depleted. A silver-zinc battery is capable of being recharged but includes a higher maximum voltage compared to that of the zinc-air battery. For instance, the zinc-air battery may include a maximum voltage of about 1.45 V and the silver-zinc battery may include a maximum voltage of about 1.86 V. This maximum voltage corresponding to the silver-zinc battery may exceed voltage thresholds of existing electronics within the hearing aid. Accordingly, the silver-zinc battery cannot simply be utilized as a substitute for the zinc-air battery unless the maximum voltage is lowered or the electronic components within the hearing aid are redesigned.

A rechargeable hearing aid is required to be turned off and unpowered to avoid draining the battery during charging events and prevent feedback noise or whistling from occurring while the battery of the hearing aid is connected to a charger. Generally, the rechargeable hearing aid utilizes designated external contacts for charging the battery. There is only enough to room to utilize two external contacts, e.g., a charger positive voltage and a charger negative voltage, due to the very small size of the hearing aid. Accordingly, an additional external contact indicating a charger present signal is not available for use to turn off the hearing aid during the charging event.

SUMMARY

One aspect of the disclosure provides an apparatus for managing power within a voltage regulating circuit of a battery-powered hearing aid device. The apparatus includes an input terminal of a voltage regulator that receives an input voltage supplied by a battery and an output terminal of the voltage regulator that provides an output voltage to a hearing aid terminal. The hearing aid terminal is electrically connected to one or more electrical components of the hearing aid device. The output voltage is based on the input voltage. The apparatus also includes a sensing terminal of the voltage regulator for sensing a charging current between the charging device and charging contacts of the voltage regulating circuit. The voltage regulating circuit is configured to reduce a magnitude of the input voltage when the magnitude of the input voltage exceeds an input voltage threshold to generate the output voltage having a magnitude that is less than a maximum output voltage.

Implementations of the disclosure may include one or more of the following optional features. In some embodiments, the apparatus includes a switch device. The switch device is configured to transition to an ON state to allow the charging device to charge the battery based on the sensing terminal of the voltage regulator sensing the charging current between the charging device and the charging contacts. In these embodiments, the switch device is also configured to transition to an OFF state to block battery voltage from the charging contacts when the output voltage is present. The switch device may further include a metal-oxide-semiconductor field-effect transistor and it may be integrated into the voltage regulator.

In some examples, the charging contacts of the voltage regulating circuit include only a positive contact and a negative contact. The voltage regulator may include a switching DC-DC converter utilized to reduce the magnitude of the input voltage and generate the output voltage by a desired ratio when the magnitude of the input voltage exceeds an upper voltage plateau threshold that is greater than the input voltage threshold.

The apparatus may include a plurality of flying capacitors, each having an identical capacitance and electrically connected to the voltage regulator. The flying capacitors may be configured to transfer charge from the input voltage to the output voltage when the switching DC-DC converter is being utilized. The voltage regulator may further include a linear DC-DC converter utilized to reduce the magnitude of the input voltage and output the output voltage to a predetermined value when the magnitude of the input voltage exceeds the input voltage threshold and does not exceed an upper voltage plateau threshold. The voltage regulator may include a bypass switch utilized to minimize reducing of the input voltage and generate the output voltage having a magnitude that is less than the maximum output voltage when the input voltage does not exceed the input voltage threshold. The battery may include a reduced voltage battery having a maximum voltage less than the input voltage threshold, and it may include an increased voltage battery having a maximum voltage that exceeds the input voltage threshold. In some examples, the reduced voltage battery has an open circuit voltage or voltage under load of from about 0.9 V to about 1.5 V when the battery has a state of charge (SOC) of about 100% (e.g., from 90% to about 100%). In some examples, the increased voltage battery has an open circuit voltage or voltage under load of greater than about 1.5 V (e.g., from about 1.6 V to about 3.0 V) when the battery has an SOC of about 100% (e.g., from about 90% to about 100%). And, in some examples, the input voltage threshold is about 1.5 V (from about 1.50 V to about 1.55 V).

Another aspect of the disclosure provides a method for managing power within a voltage regulating circuit of a battery-powered hearing aid device. The method includes a processing device of a voltage regulator of the voltage regulating circuit executing the following steps. The steps include monitoring an input voltage supplied by a battery for powering one or more electrical components of the hearing aid device and comparing a magnitude of the input voltage to an input voltage threshold. When the magnitude of the input voltage is not greater than the input voltage threshold, the method includes determining the battery is indicative of a reduced voltage battery and minimizing reducing of the input voltage to output an output voltage for powering the one or more electrical components. When the magnitude of the input voltage is greater than the input voltage threshold, the method includes determining the battery is indicative of an increased voltage battery and reducing the input voltage to output an output voltage having a magnitude that is less than a maximum output voltage for powering the one or more electrical components.

This aspect may include one or more of the following optional features. The method may include monitoring a presence of a charging voltage signal indicating one of a charge current and periodic current pulses from a charging device electrically connected to the voltage regulating circuit for charging the battery. The method may optionally include controlling the output voltage to decrease to zero to shut down the hearing aid device based on the presence of the charging voltage signal and transitioning a switch device to an ON state to allow the charging device to fully charge the battery. The method may also include transitioning a switch device to an OFF state when the one or more electrical components are being powered by the output voltage. The OFF state of the switch device may block exposure of voltage to charging contacts of the voltage regulating circuit.

In some implementations, reducing the input voltage to output the output voltage having the magnitude that is less than the maximum output voltage includes comparing the input voltage to an upper voltage plateau threshold. Here, the upper voltage plateau threshold is greater than the input voltage threshold. When the input voltage exceeds the upper voltage plateau threshold, the method may include proportionally reducing the input voltage by a switching DC-DC converter of the voltage regulator to generate the output voltage that does not violate the maximum output voltage. When the input voltage exceeds the input voltage threshold and does not exceed the upper voltage plateau, the method may include reducing the input voltage by a linear DC-DC converter to deliver a constant predetermined output voltage that does not violate the maximum output voltage.

The electrical components of the hearing aid device may include at least one of a microphone, a signal processor, an audio amplifier, related electrical circuitry, and a loud speaker. The voltage battery may include a zinc-air batter, a nickel-metal hydride battery, or a rechargeable silver-zinc battery.

DESCRIPTION OF DRAWINGS

The following figures are provided by way of example and are not intended to limit the scope of the invention.

Like reference symbols in the various drawings indicate like elements.

DETAILED DESCRIPTION

Figure 1:
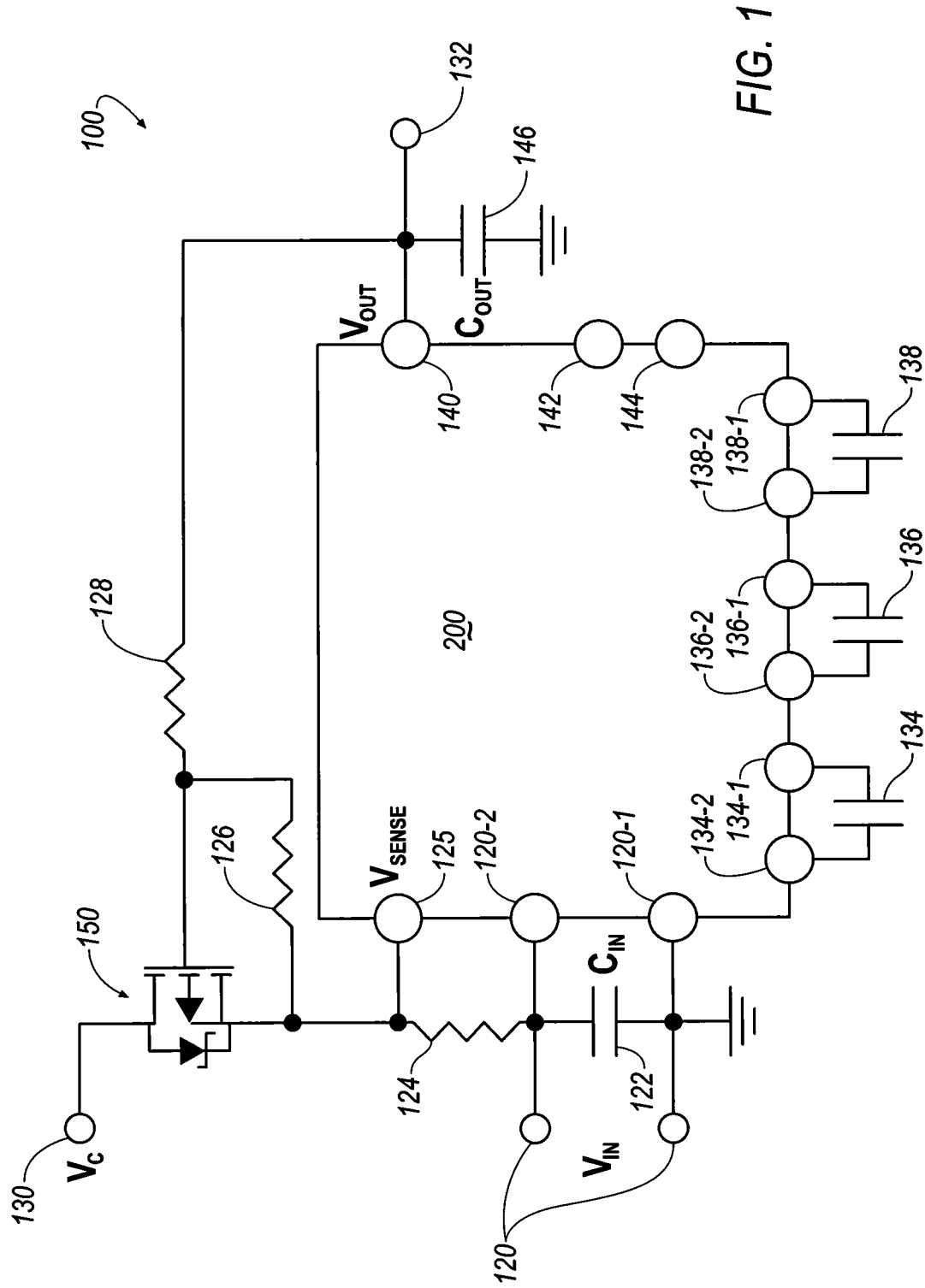
FIG. 1 is a schematic of a voltage regulating circuit of a battery-powered hearing aid device, in accordance with the present disclosure.

Referring to FIG. 1, a schematic of a voltage regulating circuit 100 of a battery-powered hearing aid device is depicted for regulating output voltage ($V_{OUT}$) that powers electrical components of the hearing aid device. While implementations herein are directed toward powering a hearing aid device, this disclosure is equally applicable for regulating output voltage supplied from a battery for powering electrical components corresponding to other devices or systems not limited to hearing aid devices. The voltage regulating circuit 100 (hereinafter "regulating circuit 100") includes a battery 120, an input capacitor $C_{IN}$ 122, current sense resistor $R_C$ 124, battery resistors $R_{B1}$ 126 and $R_{B2}$ 128, a switch device 150, a charging terminal 130, a hearing aid terminal 132, an output capacitor $C_{OUT}$ 146, and a voltage regulator 200. In a non-limiting example, the $C_{IN}$ 122 and the $C_{OUT}$ 146 are both equal to 1.0 µF, the $R_C$ 124 is equal to 49.9Ω, and the battery resistors $R_{B1}$ 126 and $R_{B2}$ 128 are equal to 499 kΩ and 1.0 MΩ, respectively.

The battery 120 supplies an input voltage ($V_{IN}$) via negative and positive terminals to corresponding terminals 120-1 and 120-2 of the voltage regulator 200. In the illustrated example, the negative and positive terminals 120-1 and 120-2, respectively, of the voltage regulator 200 may be collectively referred to as an "input terminal" of the voltage regulator 200. Based upon the magnitude of the $V_{IN}$ supplied from the battery 120, the voltage regulator 200 provides the $V_{OUT}$ via output terminal 140 for powering the hearing aid terminal 132 electrically connected to one or more of the electrical components of the hearing aid device. Embodiments herein are directed toward the voltage regulator 200 reducing the magnitude of the $V_{IN}$ supplied from the battery 120 when the magnitude of the $V_{IN}$ exceeds an input voltage threshold ($V_{in\_thresh}$) to ensure that the resulting $V_{OUT}$ does not exceed a maximum output voltage ($V_{out\_max}$). As used herein, the term "maximum output voltage ($V_{out\_max}$)" refers to a maximum allowable output voltage that can be utilized to power the electrical components of the hearing aid device without causing harm or damage thereto. In a non-limiting example, the $V_{out\_max}$ is from about 1.5 V to about 1.6 V (e.g., about 1.6 V). As used herein, the term "electrical components" can refer to, but are not limited to, a microphone, a signal processor, an audio amplifier, related electrical circuitry, and a loudspeaker.

In some embodiments, the regulating circuit 100 is configured to accept either one of a reduced voltage battery and an increased voltage battery. For example, the battery 120 may be a reduced voltage battery that can include a zinc-air battery (e.g., button cell), a nickel-metal hydride battery (NiMH) battery (e.g., button cell), or an alkaline manganese dioxide battery (e.g., button cell); or the battery 120 may be an increased voltage battery that can include a silver-zinc battery (e.g., button cell) or a lithium ion battery (e.g., button cell). Zinc-air batteries are generally non-rechargeable. NiMH, lithium ion, and silver-zinc batteries are rechargeable. Hereinafter, the reduced voltage battery will simply be referred to as the zinc-air battery and the increased voltage battery will simply be referred to as the silver-zinc battery; however, any battery cell type not exceeding the $V_{in\_thresh}$ is a "reduced voltage battery" and any battery cell type exceeding the $V_{in\_thresh}$ is an "increased voltage battery". In a non-limiting example, the maximum voltage of the zinc-air battery is about 1.45 V to about 1.55 V under load and the maximum voltage of the silver-zinc battery is about 1.65 V to about 3.0 V (e.g., about 1.65 V to about 2.0 V) under load. Accordingly, the voltage regulator 200 may determine whether the battery 120 is either a reduced voltage battery or an increased voltage battery based upon the magnitude of the $V_{IN}$ received at the terminals 120-1 and 120-2 of the voltage regulator 200. Thereafter, the voltage regulator 200 may then by-pass any regulating or reduce the $V_{IN}$ if the battery 120 is determined to be a reduced voltage battery or the voltage regulator 200 may regulate the $V_{IN}$ if the battery 120 is determined to be an increased voltage battery. In some embodiments, the voltage regulator 200 can regulate the voltage using any combination of a switching DC-DC converter and a linear DC-DC converter based upon the magnitude of the $V_{IN}$. In some embodiments, the voltage regulator 200 only detects whether the battery 120 is an increased voltage battery when the magnitude of the $V_{IN}$ exceeds the $V_{in\_thresh}$ for a predetermined period of time. In a non-limiting example, the predetermined period of time is from about 3 min to about 10 min (e.g., about 5 minutes). And, in some embodiments, $V_{in\_thresh}$ is from about 1.45 V to about 1.50 V.

The regulating circuit of FIG. 1 may include one or more flying capacitors depending on a desired ratio of $V_{OUT}$ to be generated by the switching DC-DC converter 230. In the illustrated example of FIG. 1, the regulating circuit 100 includes first, second and third flying capacitors $C_1$ 134, $C_2$ 136 and $C_3$ 138, respectively. Each of the flying capacitors is substantially identical, and in a non-limiting example, include a capacitance of 470 nF. The flying capacitors are configured to transfer charge from the $V_{IN}$ to the $V_{OUT}$ when the switching DC-DC converter of the voltage regulator 200 is being utilized. Negative terminals of the flying capacitors are electrically connected to corresponding terminals 134-1, 136-1 and 138-1 of the voltage regulator 200. Positive terminals of the flying capacitors are electrically connected to corresponding terminals 134-1, 136-1 and 138-1 of the voltage regulator 200. The voltage regulator 200 further includes end-of-life (EOL) voltage terminals 142 and 144 to configure EOL voltages necessary to signal a low battery warning at the hearing aid terminal 132.

Still referring to FIG. 1, the charging terminal 130 may be selectively electrically connected to a charging device for charging the battery 120 if the battery is of the cell type that is rechargeable, e.g., silver-zinc or lithium ion cells. Hearing aids must be sufficiently small enough to fit inside the user's ears or just outside the ears. Due to the small size, the charging terminal 130 is constrained to only include two contacts (i.e., positive and negative charging contacts) for electrically connecting to the charging device for charging the battery 120. An additional contact indicating the presence of the charging device is not present. Accordingly, to indicate that the regulating circuit 100 is electrically connected to the charging device and the battery is undergoing the charging event, the voltage regulator 200 includes a sensing terminal 125 for sensing a charging current ($V_{SENSE}$) between the battery 120 and the charging device via the charging contacts of the terminal 130. Specifically, the charging current ($V_{SENSE}$) is sensed by detecting voltage across the current sense resistor $R_C$ 124. The hearing aid device must be shut down (e.g., off mode or stand-by mode) to avoid draining the battery 120 during the charging event and to prevent feedback noise or whistling from occurring while in the charger. Thus, the voltage regulator 200 detects the presence of a charge current via the sensing terminal 125 and reduces the $V_{OUT}$ to zero to shut down the hearing aid device during the charging event. In some implementations, periodic current pulses may be provided from the charging device to maintain the $V_{OUT}$ at zero after charging is completed but the charging terminal 130 and the charging device are still electrically connected. Here, the voltage regulator 200 may enable the voltage output to turn on the hearing aid device once charging terminal 130 is disconnected from the charging device and the voltage regulator 200 no longer senses charge current or periodic current pulses via the sensing terminal 125.

The switch device 150 is controlled by the output terminal 140 to block any voltage from the charging contacts of the charging terminal 130 when the hearing aid device is being powered via the $V_{OUT}$. It is desirable to block battery voltage from the charging contacts because any exposure to voltage may result in a short circuit or result in an undesirable leakage of current. Accordingly, when there is a presence of $V_{OUT}$ at the output terminal 140, the switch device 150 can turn to an OFF state to block the flow of current to the charging contacts of the charging terminal 130. Likewise, when the sensing terminal 125 detects that the battery 120 is undergoing a charging event, the voltage regulator 200 may reduce the $V_{OUT}$ to zero to turn off the hearing aid device, thereby permitting the switch device 150 to transition to an ON state and allow the charging device to fully charge the battery 120. In the illustrated example of FIG. 1, the switch device 150 includes a metal-oxide-semiconductor field-effect transistor (MOSFET). While the illustrated example of FIG. 1 depicts the switch device 150 outside of the voltage regulator 200, some implementations may include the switch device 150 integrated within the voltage regulator 200.

Figure 2:
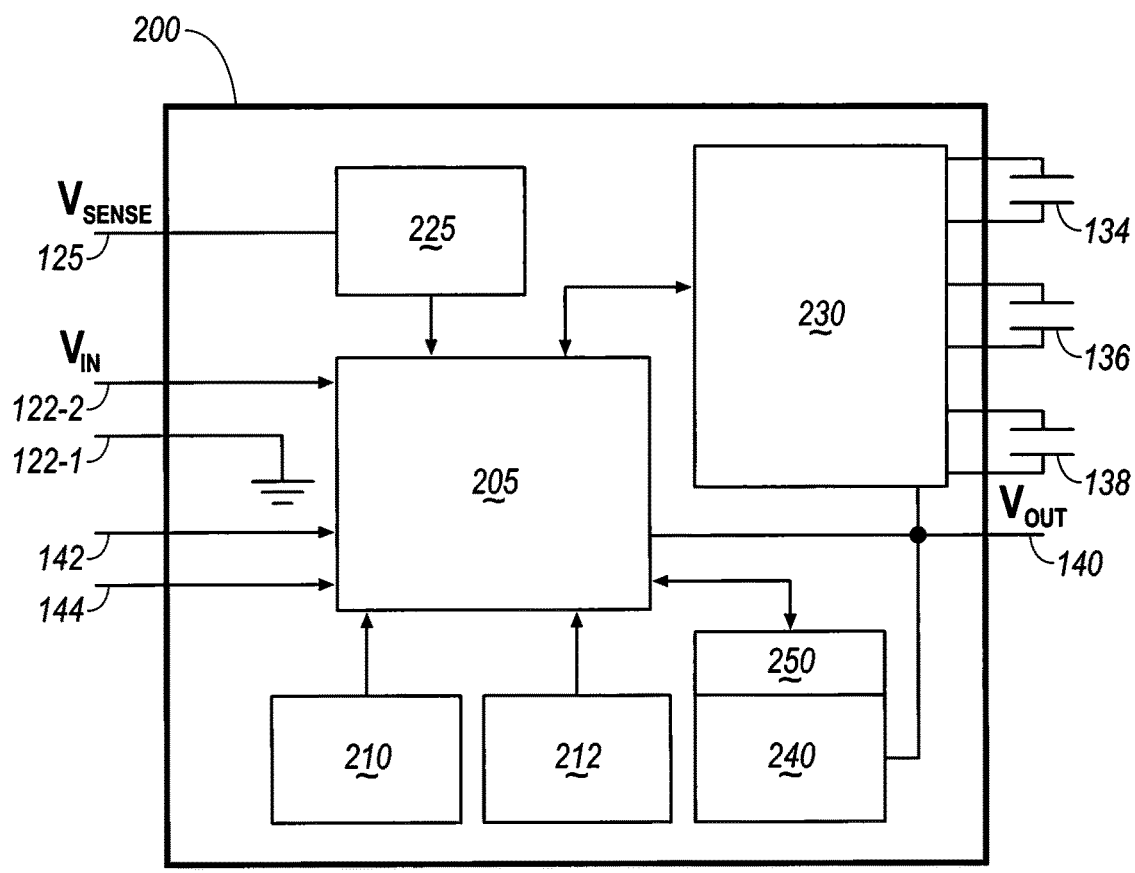
FIG. 2 is a block diagram of a voltage regulator of the voltage regulating circuit of FIG. 1, in accordance with the present disclosure.

FIG. 2 is a block diagram of the voltage regulator 200 of the voltage regulating circuit 100 of FIG. 1, in accordance with the present disclosure. The voltage regulator 200 can be described with reference to the voltage regulating circuit 100 of FIG. 1. The voltage regulator 200 includes a regulator controller block 205, a supply reversal protection block 210, a clock source 212, a charging detection block 225, the switching DC-DC converter 230, the linear DC-DC converter 240 and a bypass switch block 250.

The regulator controller block 205 monitors a plurality of input signals and controls the voltage regulator 200 based upon one or more of the monitored input signals. The regulator controller block 205 includes a processing device. In some implementations, the regulator controller block 205 monitors whether or not the battery 120 is undergoing a charging event, or the charging terminal is electrically connected to the charging device, based upon an input signal received from the charging detection block 225. For instance, the charging detection block 225 can detect the presence of the charging event based upon the $V_{SENSE}$ signal received from the sensing terminal 125 indicating the charge current (or periodic current pulses) from the charging device via terminal 130. Thereafter, the regulator controller block 205 can control the $V_{OUT}$ to zero such that the hearing aid device is shutdown. When the $V_{OUT}$ is controlled to zero, the switching device 150 transitions to the ON state and allows the charging device to fully charge the battery 120. Likewise, when the charging detection block 225 does not detect the presence of the charging terminal 130 to be electrically connected to the charging device, the regulator controller block 205 will permit the $V_{OUT}$ to power the hearing aid terminal 132, whereby the switch device 150 is transitioned to the OFF state to block the flow of current to the electrical contacts of the charging terminal 130.

In some implementations, the regulator controller block 205 monitors the magnitude of $V_{IN}$ supplied by the battery 120 at the positive terminal 120-2. In the illustrated example of FIG. 2, the negative terminal 120-1 is ground. The regulator controller block 205 may further monitor input signals indicating EOL voltages from the EOL terminals 142 and 144, reversal protection signals from block 210, and the clock source 212 for switching frequency. Described in further detail below with reference to a block diagram 300 of FIG. 3, the regulator controller block 205 can include a comparator for comparing the magnitude of the $V_{IN}$ to the input voltage threshold ($V_{in\_thresh}$) to determine whether the battery 120 is indicative of the zinc-air battery cell type or the silver-zinc battery cell type. For instance, if the magnitude of the $V_{IN}$ received by the regulator controller block 205 does not exceed the $V_{in\_thresh}$, the regulator controller block 205 will determine that the battery 120 is indicative of the zinc-air type and controls the bypass switch 250 whereby the $V_{IN}$ is not reduced or regulated and is output as the $V_{OUT}$ at the output terminal 140. Likewise, if the magnitude of the $V_{IN}$ does exceed the $V_{in\_thresh}$, the regulator controller block 205 will determine that the battery 120 is indicative of the silver-zinc battery cell type whereby the $V_{in}$ is regulated by either the switching DC-DC converter 230 or the linear DC-DC converter 240 depending upon the magnitude of the $V_{IN}$. In some implementations the magnitude of the $V_{IN}$ must exceed the $V_{in\_thresh}$ for the predetermined time period (e.g., 5 minutes) for the regulator controller block 205 to detect that the battery 120 is indicative of the silver-zinc battery. In these implementations, the regulator controller block 205 will assume that the battery 120 is indicative of the zinc-air battery for time periods less than the predetermined time period.

When the battery 120 is indicative of the silver-zinc battery cell type, or other increased voltage battery cell type, the magnitude of the $V_{IN}$ supplied therefrom must be reduced such that the resulting $V_{OUT}$ does not exceed the maximum output voltage ($V_{out\_max}$) of the electrical components powered by the $V_{OUT}$. Silver-zinc batteries possess a two plateau voltage profile that is not observed in other battery chemistries (e.g., Zn-air or lithium ion cells). The regulator controller block 205 determines the battery 120 is operating in the upper plateau voltage profile or the lower plateau voltage profile based upon the monitored input signal indicating the magnitude of the $V_{IN}$. When the battery 120 is operating in the upper plateau voltage profile, the switching DC-DC converter 230 is utilized to reduce the $V_{IN}$ and output the resulting $V_{OUT}$ by a desired ratio or percentage such that high efficiency is achieved and the $V_{out\_max}$ is not violated. In the illustrated example, the flying capacitors flying capacitors $C_1$ 134, $C_2$ 136 and $C_3$ 138 are electrically connected to the switching DC-DC converter 230. When the battery 120 discharges or depletes over time and transitions to the lower plateau voltage profile, the switching DC-DC converter is disabled and the linear DC-DC converter 240 is utilized to deliver a constant predetermined $V_{OUT}$ that does not violate the $V_{out\_max}$ independent of what the magnitude of $V_{IN}$ is equal to.

Figure 3:
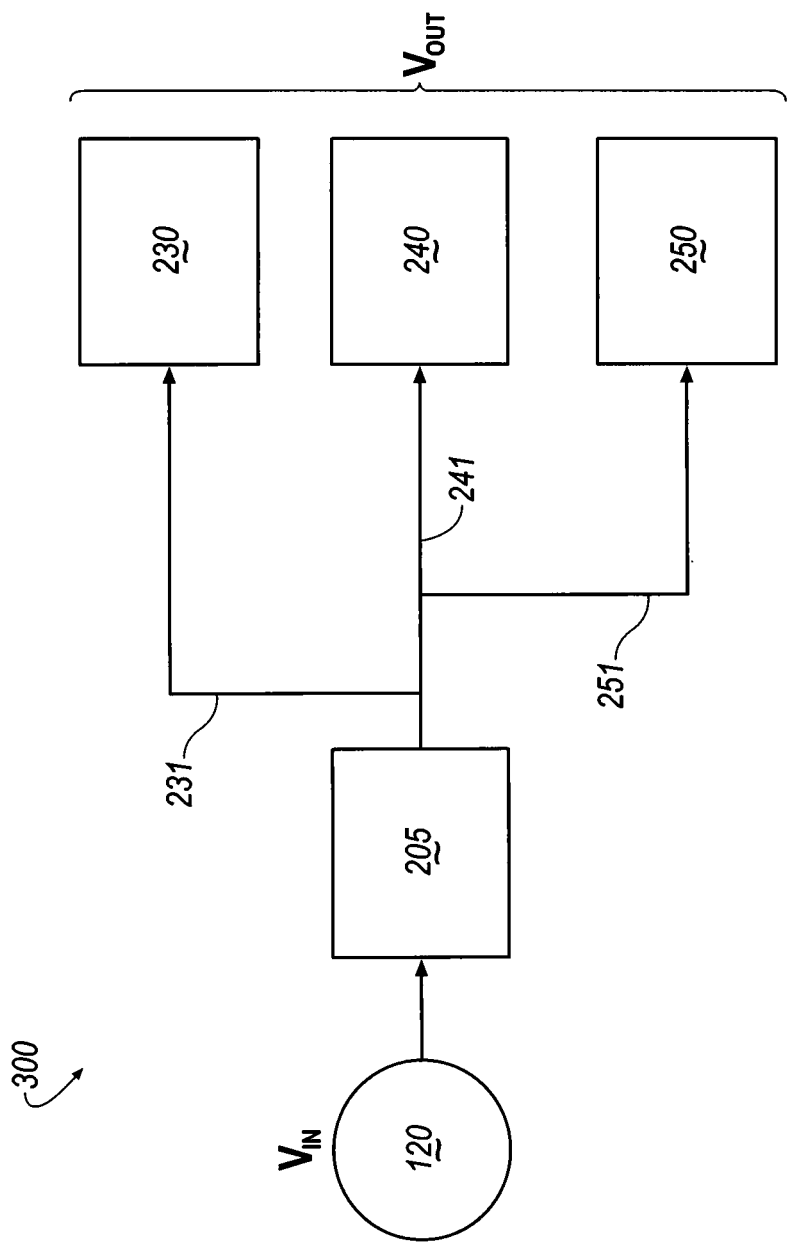
FIG. 3 is a block diagram for regulating output voltage of the voltage regulator of FIGS. 1 and 2, in accordance with the present disclosure.

Referring to FIG. 3, the block diagram 300 is illustrated for regulating output voltage of the voltage regulator of FIGS. 1 and 2, in accordance with the present disclosure. In the illustrated example, the battery 120 supplies the $V_{IN}$ to the regulator controller block 205 of FIG. 2. The $V_{IN}$ can be indicative of a magnitude within a range of voltages corresponding to either the zinc-air battery cell type or the silver-zinc battery cell type. In the non-limiting example, the range of voltages can be from about 0.9 to about 2.0 V. The regulator controller block 205 compares the magnitude of the $V_{IN}$ to the $V_{in\_thresh}$.

In some implementations, the bypass switch 250 is utilized to bypass both the switching DC-DC converter 230 and the linear DC-DC converter 240 when the magnitude of the $V_{IN}$ does not exceed the $V_{in\_thresh}$, as indicated by signal 251. Here, the battery 120 is indicative of the zinc-air battery type or NiMH type and does not require a reduction in the voltage supplied therefrom. Accordingly, the $V_{IN}$ is not regulated or reduced and the resulting $V_{OUT}$ for powering the hearing aid device does not violate the maximum output voltage ($V_{out\_max}$).

In some implementations, the switching DC-DC converter 230 is utilized when the magnitude of the $V_{IN}$ exceeds an upper voltage plateau threshold ($V_{upper\_thresh}$) that is greater than the $V_{in\_thresh}$, as indicated by signal 231. Here, the battery 120 is indicative of the silver-zinc battery type operating in the upper voltage plateau profile requiring a reduction in the voltage supplied therefrom. Accordingly, the $V_{IN}$ is proportionally reduced by the switching DC-DC converter 230 whereby the resulting $V_{OUT}$ for powering the hearing aid device does not violate the $V_{out\_max}$.

In some implementations, the linear DC-DC converter 240 is utilized when the magnitude of the $V_{IN}$ exceeds the $V_{in\_thresh}$ but does not exceed the upper plateau voltage threshold ($V_{upper\_thresh}$), as indicated by signal 241. Here, the battery 120 is indicative of the silver-zinc battery type and operating in the lower voltage plateau profile requiring a reduction in the voltage supplied therefrom. The linear DC-DC converter 240 can be utilized subsequent to the utilization of the switching DC-DC converter 250 upon the magnitude of the $V_{IN}$ falling to the lower plateau voltage profile to thereby permit the highest efficiency to be obtained from the battery 120. Accordingly, the $V_{IN}$ is reduced by the linear DC-DC converter 240 whereby the resulting $V_{OUT}$ is equal to a predetermined value for powering the electrical components of the hearing aid device that does not violate the $V_{out\_max}$.

Figure 4:
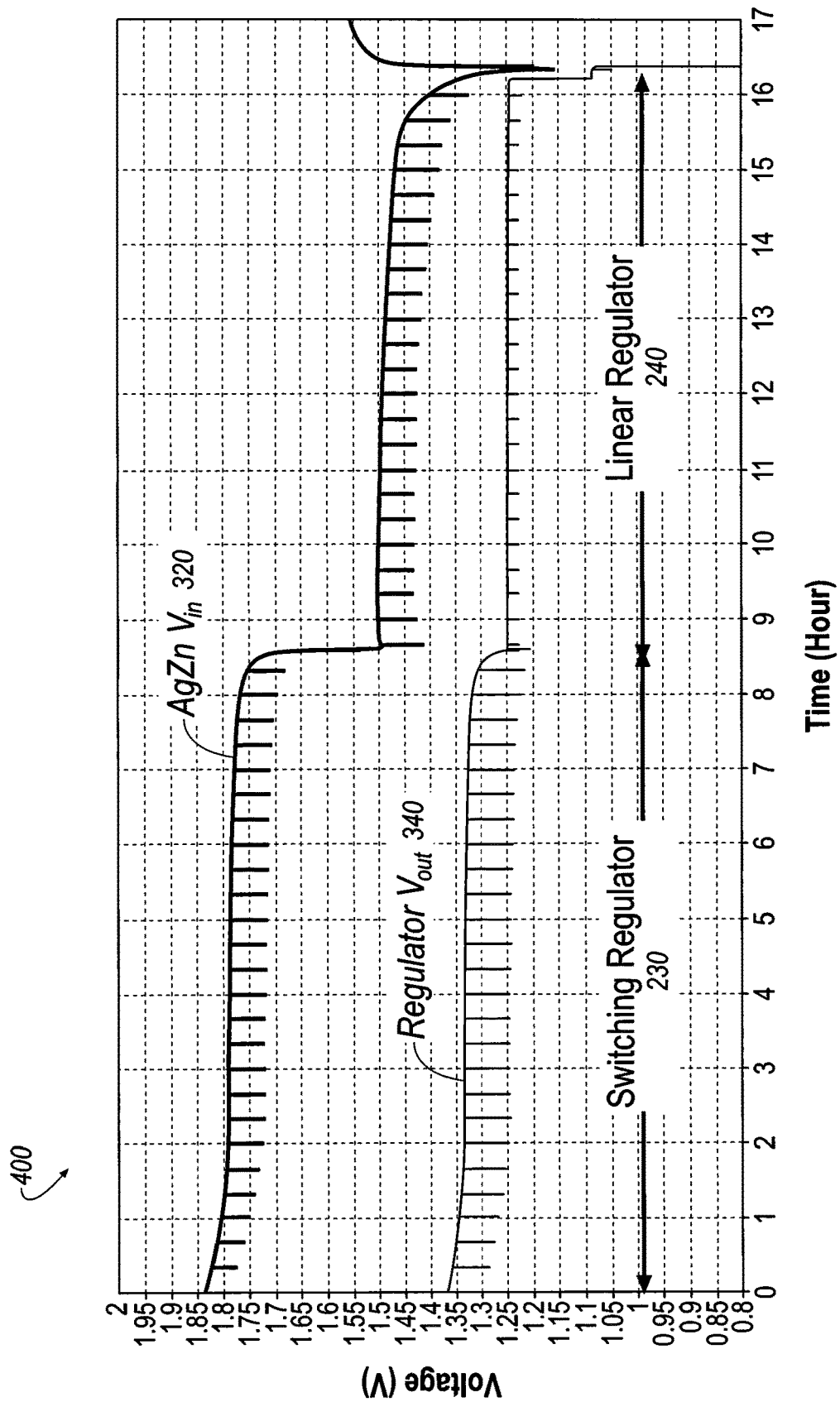
FIG. 4 is a non-limiting plot of exemplary test data illustrating input and output voltages for a silver-zinc battery using the voltage regulating circuit of FIG. 1, in accordance with the present disclosure.

FIG. 4 is a non-limiting plot 400 of exemplary test data illustrating input and output voltages for a silver-zinc battery using the voltage regulating circuit of FIG. 1, in accordance with the present disclosure. A 2 mA background current drain is applied with periodic 100 ms 10 mA pulses every 20 minutes. The horizontal x-axis denotes time (Hour) and the vertical y-axis indicates voltage (V). The plot 400 includes an input voltage profile 320 for the silver-zinc (AgZn) battery that includes an upper plateau voltage until about 8.5 hours before falling to a lower plateau voltage until depleting at about 16 hours. The plot 400 further includes a resulting output voltage profile 340 based upon the input voltage being reduced by the voltage regulator 200 of FIG. 1. In the illustrated example, the input voltage profile 320 is regulated by the switching DC-DC converter 230 to output the resulting output voltage profile 340 between about 0 and about 8.5 hours while the silver-zinc battery is operative in the upper plateau voltage. Here, the switching DC-DC converter 230 reduces the input voltage to about 75% (e.g., from about 70% to about 80%). The ratio or percentage at which the input voltage is reduced can be based upon the switched capacitor or inductor design in some implementations and the desired load for powering the hearing aid device. Likewise, the input voltage profile 320 is regulated by the linear DC-DC converter to output the resulting output voltage profile 340 after 8.5 hours while the silver-zinc battery is operative in the lower voltage plateau. Here, the linear DC-DC converter 240 outputs the resulting output voltage at about 1.25 V independent of what the input voltage profile 320 is equal to. For instance, the output voltage profile remains at 1.25 V even though the input voltage profile 320 is decreasing after 15 hours.

Figure 5:
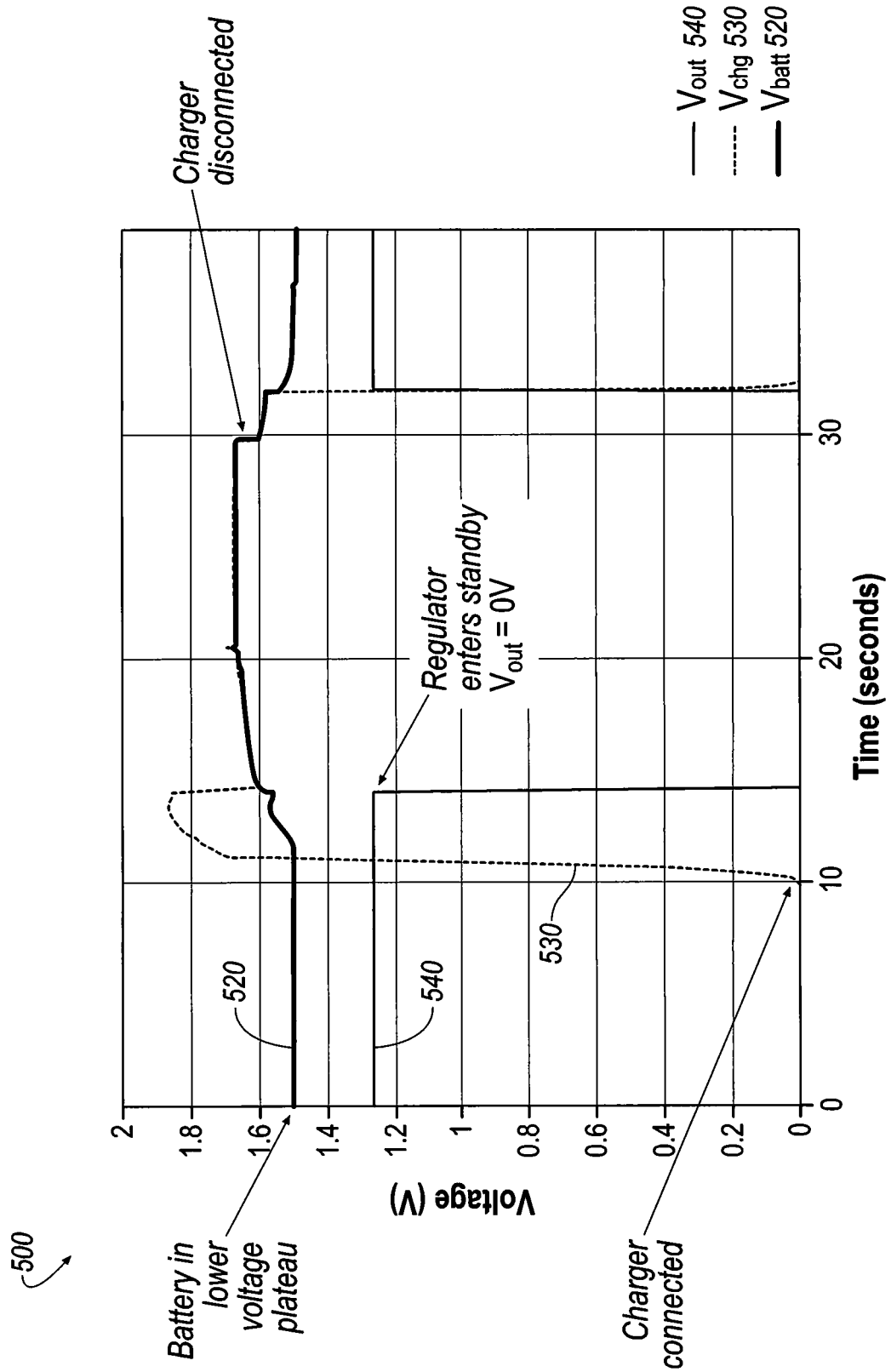
FIG. 5 is a non-limiting plot of exemplary test data illustrating input and output voltages during a charging event of the battery of the voltage regulating circuit of FIG. 1, in accordance with the present disclosure.

FIG. 5 is a non-limiting plot 500 of exemplary test data illustrating input and charging output voltages during a charging event of the battery 120 of the voltage regulating circuit of FIG. 1, in accordance with the present disclosure. The horizontal x-axis denotes time (seconds) and the vertical y-axis denotes voltage (V). The non-limiting plot 500 depicts an input voltage profile 520 supplied from the battery 120, a charging voltage profile 530 at the terminal 130 and an output voltage profile 540 corresponding to the $V_{OUT}$ at the output terminal 140 of FIG. 1. Between about 0 and about 13 seconds, the input voltage profile 520 is about 1.5 V indicating a silver-zinc battery operating in the lower voltage plateau and the resulting output voltage profile 540 is about 1.25 V subsequent to being reduced by the linear DC-DC converter 240 of FIG. 2. At about 10 seconds, the charging terminal 130 is electrically connected to the charging device (e.g., the presence of the charging current ($V_{SENSE}$) is sensed) to initiate a charging event whereat the charging voltage profile 530 increases from zero to a brief peak of about 1.9 V at about 14 seconds. In response to the charging event, the output voltage profile 540 is reduced to zero at about 14 seconds to turn off (e.g., stand-by mode) the hearing aid device permitting the switch device 150 of FIG. 1 to transition to the ON state and allow the charging device to fully charge the battery 120. Specifically, the brief peak of the charging voltage profile 530 of about 1.9 V at about 14 seconds results from the voltage drop across a diode in the switching device 150 that falls once the $V_{OUT}$ is equal to zero and the switching device 150 transitions to the ON state. The input voltage profile 520 increases in response to being charged during the charging event. At about 30 seconds, the charging terminal 130 is disconnected from the charging device whereat the charging voltage profile 530 is reduced to zero and the output voltage profile 540 is increased to 1.25 V due to the output voltage being allowed to now power the electrical components of the hearing aid device. Hence, at about 30 seconds, the sensing terminal 125 is not sensing the presence of the electrical connection (e.g., the presence of the charging current ($V_{SENSE}$) is sensed) between the battery 120 and the charging device.

Figure 6:
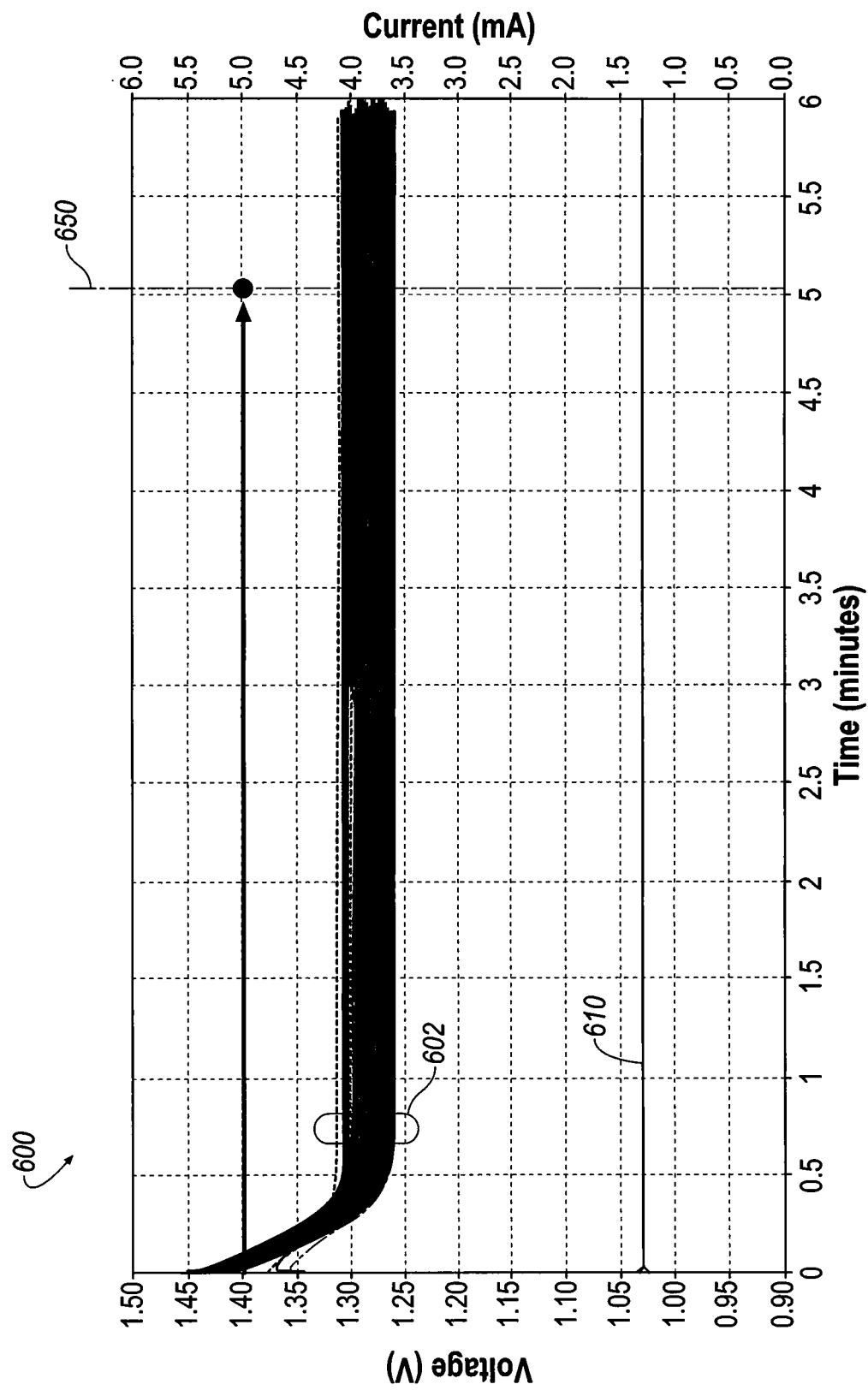
FIG. 6 is a non-limiting plot of exemplary test data illustrating voltage profile lines over a predetermined time to detect a zinc-air battery, in accordance with the present disclosure.

FIG. 6 is a non-limiting plot 600 of exemplary test data illustrating voltage profile lines over a predetermined time to detect a zinc-air battery, in accordance with the present disclosure. The horizontal x-axis denotes time (minutes) and the left-side vertical y-axis denotes voltage (V) and the right-side vertical y-axis denotes current (mA). A current profile 610 indicates the load at which the battery is operating. In the non-limiting example of FIG. 10, the current profile 610 equal to about a 1.3 mA load. The voltage profile lines 602 depict battery voltage while the battery is under the 1.3 mA load at an ambient temperature of 25° C. and 50% relative humidity. Vertical line 650 indicates a 5 minute threshold whereat a decision is made that the battery is indicative of the zinc-air battery cell type since the voltage profile lines 602 are relatively stable between about 1.26 to about 1.31 V and not exceeding the input voltage threshold ($V_{in\_thresh}$) 60. In the illustrated example, the $V_{in\_thresh}$ is equal to 1.40 V.

Figure 7:
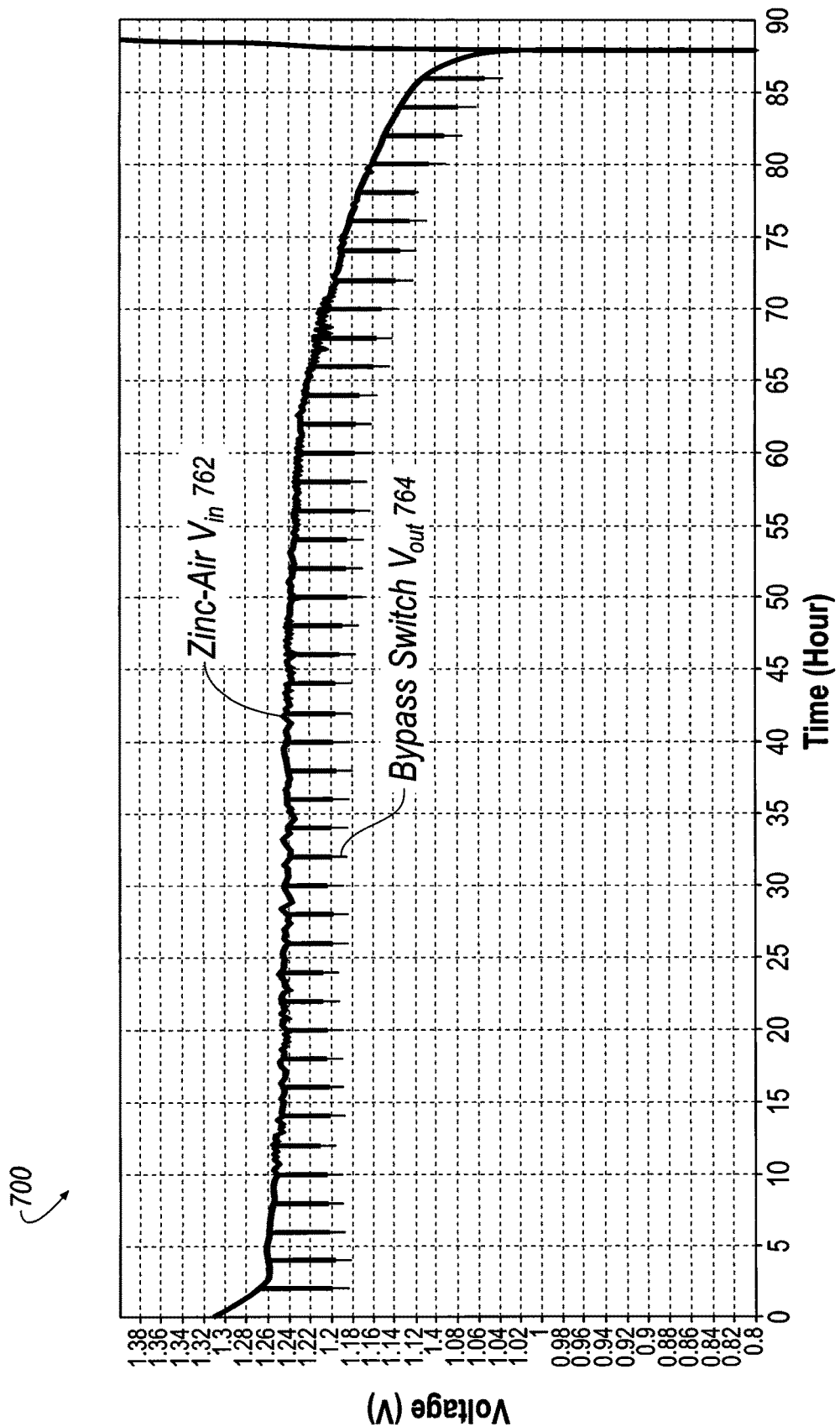
FIG. 7 is a non-limiting plot of exemplary test data illustrating input and output voltages for a zinc-air battery bypassing the voltage regulator of FIG. 1, in accordance with the present disclosure.

FIG. 7 is a non-limiting plot 700 illustrating exemplary test data of input and output voltages for a zinc-air battery when bypassing the voltage regulator 200 of FIG. 1, in accordance with the present disclosure. The battery is discharged at an ambient temperature of 25° C. and 50% relative humidity. The horizontal x-axis denotes time (Hour) and the vertical y-axis denotes voltage (V). The plot 700 includes an input voltage profile 762 for a life cycle of the zinc-air battery that depletes after about 87 hours. Due to the battery being indicative of the zinc-air battery cell type, the voltage regulator is by-passed and an output voltage profile 764 is approximate to the input voltage profile 762. The output voltage profile 764 depicts a 100 ms 10 mA current pulse every 2 hours during a 2 mA background current gain.

Figure 8:
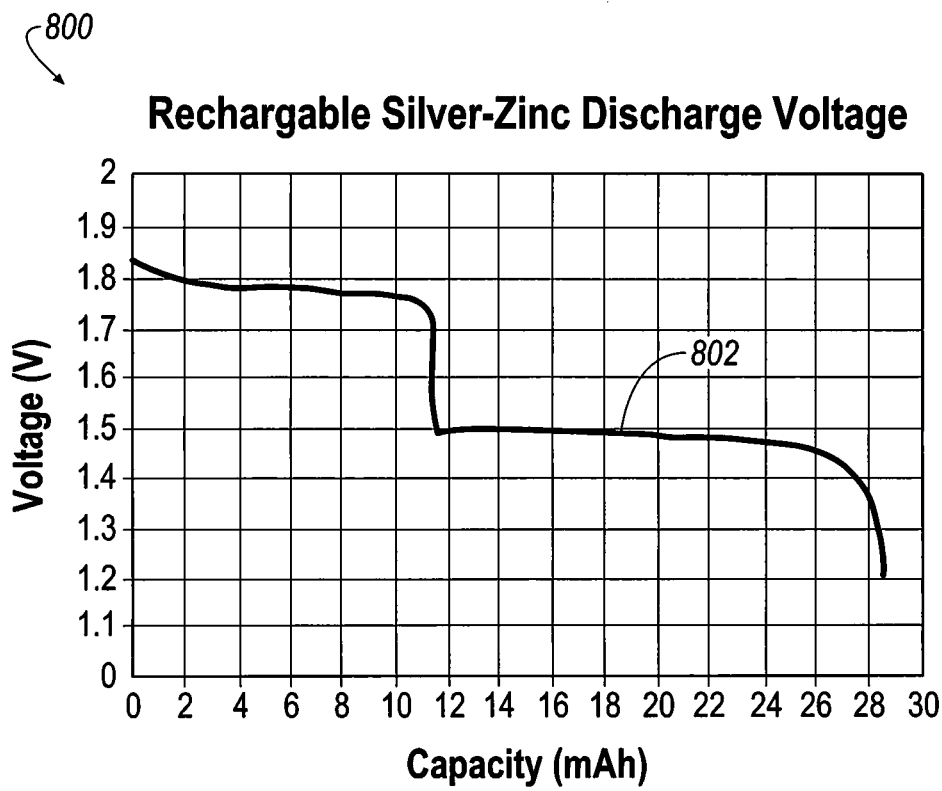
FIG. 8 is a non-limiting plot of exemplary test data illustrating a discharge voltage profile for a rechargeable silver-zinc battery, in accordance with the present disclosure.

FIG. 8 is a non-limiting plot 800 of exemplary test data illustrating a discharge voltage profile 802 for a rechargeable silver-zinc battery, in accordance with the present disclosure. The horizontal x-axis denotes capacity (mAh) and the vertical y-axis denotes voltage (V). The discharge voltage profile 802 is indicative of the silver-zinc battery operative in the upper voltage plateau from about 0 to about 12 mAh until falling to being operative in the lower voltage plateau from about 12 to 28 mAh before being depleted.

Figure 9:
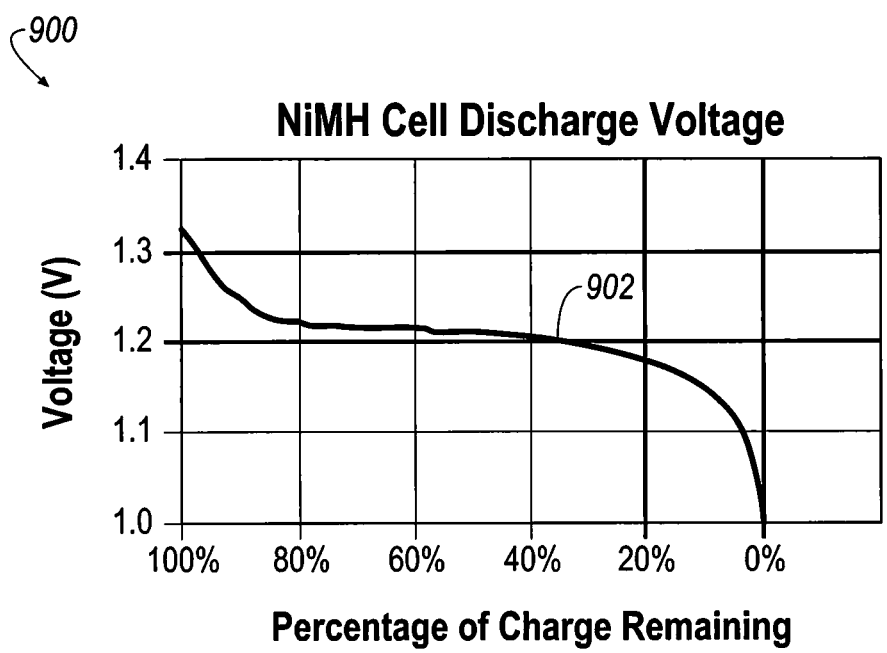
FIG. 9 is a non-limiting plot of exemplary test data illustrating a discharge voltage profile for a nickel-metal hydride (NiMH) battery cell, in accordance with the present disclosure.

FIG. 9 is a non-limiting plot 900 of exemplary test data illustrating a discharge voltage profile 902 for a nickel-metal hydride (NiMH) battery, in accordance with the present disclosure. The horizontal x-axis denotes a percentage of charge remaining within the NiMH battery and the vertical y-axis denotes voltage (V). The discharge voltage profile line 902 discharges a relatively stable voltage of about 1.2 V while the percent of charge remaining is between about 80 to 30%. Once the percentage of charge remaining in the NiMH battery is about 30%, the discharge voltage drastically reduces to about 1.0 V when there is no charge remaining.

Figure 10:
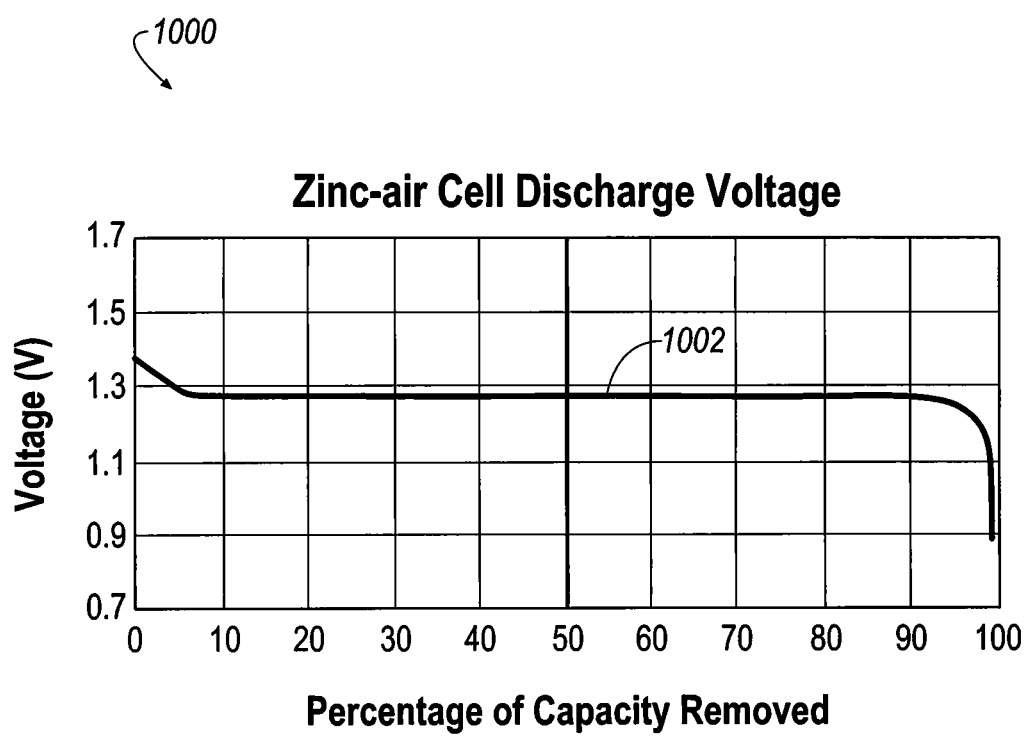
FIG. 10 is a non-limiting plot of exemplary test data illustrating a discharge voltage profile for a zinc-air battery cell, in accordance with the present disclosure.

FIG. 10 is a non-limiting plot 1000 of exemplary test data illustrating a discharge voltage profile 1002 for a zinc-air battery, in accordance with the present disclosure. The horizontal x-axis denotes a percentage of capacity removed and the vertical y-axis denotes voltage (V). The discharge voltage profile line 1002 is relatively stable from about 1.3 V until about 90% of the capacity of the zinc-air battery is depleted. After 90% of the capacity has been depleted, the discharge voltage profile 1002 of the zinc-air battery cell drastically reduces. Thus, the zinc-air battery cell includes a high energy efficiency, enabling a desired discharge voltage to be maintained during a majority of the life of the zinc-air battery cell.

A number of implementations have been described. Nevertheless, it will be understood that various modifications may be made without departing from the spirit and scope of the disclosure. Accordingly, other implementations are within the scope of the following claims.

What is claimed is:

1. An apparatus for managing power within a voltage regulating circuit of a battery-powered hearing aid device, comprising:
   an input terminal of a voltage regulator receiving an input voltage ($V_{IN}$) supplied by a battery;
   an output terminal of the voltage regulator providing an output voltage ($V_{OUT}$) to a hearing aid terminal electrically connected to one or more electrical components of the hearing aid device, the output voltage ($V_{OUT}$) based on the input voltage ($V_{IN}$);
   a sensing terminal of the voltage regulator for sensing a charging current ($V_{SENSE}$) between a charging device and charging contacts of the voltage regulating circuit; and
   a switch device configured to:
      transition to an ON state to allow the charging device to charge the battery based on the sensing terminal of the voltage regulator sensing the charging current ($V_{SENSE}$) between the charging device and the charging contacts; and
      transition to an OFF state to block the charging contacts from receiving voltage from the battery when the output voltage ($V_{OUT}$) is present;
   wherein the voltage regulator is configured to reduce a magnitude of the input voltage ($V_{IN}$) when the magnitude of the input voltage ($V_{IN}$) exceeds an input voltage threshold ($V_{in\_thresh}$) to generate the output voltage ($V_{OUT}$) having a magnitude that is less than a maximum output voltage ($V_{out\_max}$) and is further configured not to downregulate the input voltage ($V_{IN}$) when the magnitude of the input voltage ($V_{IN}$) is not greater than the input voltage threshold ($V_{in\_thresh}$).

2. The apparatus of claim 1, wherein the switch device comprises a metal-oxide-semiconductor field-effect transistor (MOSFET).

3. The apparatus of claim 1, wherein the switch device is integrated into the voltage regulator.

4. The apparatus of claim 1, wherein the charging contacts of the voltage regulating circuit comprise only a positive contact and a negative contact.

5. The apparatus of any one of claims 1 and 2-4, wherein the voltage regulator further comprises a switching DC-DC converter utilized to reduce the magnitude of the input voltage ($V_{IN}$) and generate the output voltage ($V_{OUT}$) by a desired ratio when the magnitude of the input voltage ($V_{IN}$) exceeds an upper plateau voltage threshold ($V_{upper\_thresh}$) that is greater than the input voltage threshold ($V_{in\_thresh}$).

6. The apparatus of claim 5, further comprising a plurality of flying capacitors each having a substantially identical capacitance and electrically connected to the voltage regulator, the flying capacitors configured to transfer charge from the input voltage ($V_{IN}$) to the output voltage ($V_{OUT}$) when the switching DC-DC converter is being utilized.

7. The apparatus of any one of claims 1 and 2-4, wherein the voltage regulator further comprises a linear DC-DC converter utilized to reduce the magnitude of the input voltage ($V_{IN}$) and output the output voltage ($V_{OUT}$) to a predetermined value when the magnitude of the input voltage ($V_{IN}$) exceeds the input voltage threshold ($V_{in\_thresh}$) and does not exceed an upper plateau voltage threshold ($V_{upper\_thresh}$).

8. The apparatus of any one of claims 1 and 2-4, wherein the voltage regulator further comprises a bypass switch utilized so that the input voltage ($V_{IN}$) bypasses the voltage regulator when the input voltage ($V_{IN}$) does not exceed the input voltage threshold ($V_{in\_thresh}$).

9. The apparatus of claim 1, wherein the battery comprises a reduced voltage battery having a maximum voltage less than the input voltage threshold ($V_{in\_thresh}$).

10. The apparatus of claim 1, wherein the battery comprises an increased voltage battery having a maximum voltage that exceeds the input voltage threshold ($V_{in\_thresh}$).

11. A method for managing power within a voltage regulating circuit of a battery-powered hearing aid device, comprising:
   a processing device of a voltage regulator of the voltage regulating circuit executing the following steps, comprising:
      monitoring an input voltage ($V_{IN}$) supplied by a battery for powering one or more electrical components of the hearing aid device;
      comparing a magnitude of the input voltage ($V_{IN}$) to an input voltage threshold ($V_{in\_thresh}$);
      monitoring a presence of a charging voltage signal ($V_{SENSE}$) indicating one of a charge current and periodic current pulses from a charging device electrically connected to the voltage regulating circuit for charging the battery;
      controlling an output voltage ($V_{OUT}$) to decrease to zero to shut down the hearing aid device based on the presence of the charging voltage signal ($V_{SENSE}$);
      transitioning a switch device to an ON state to allow the charging device to fully charge the battery; and
      when the magnitude of the input voltage ($V_{IN}$) is not greater than the input voltage threshold ($V_{in\_thresh}$), determining the battery is indicative of a reduced voltage battery and not downregulating the input voltage ($V_{IN}$) for powering the one or more electrical components; and
      when the magnitude of the input voltage ($V_{IN}$) is greater than the input voltage threshold ($V_{in\_thresh}$), determining the battery is indicative of an increased voltage battery and reducing the input voltage ($V_{IN}$) to output the output voltage ($V_{OUT}$) having a magnitude that is less than a maximum output voltage ($V_{out\_max}$) for powering the one or more electrical components.

12. The method of claim 11, further comprising transitioning a switch device to an OFF state when the one or more electrical components are being powered by the output voltage ($V_{OUT}$), the OFF state of the switch device blocking exposure of voltage to charging contacts of the voltage regulating circuit.

13. The method of any one of claims 11 and 12, wherein reducing the input voltage ($V_{IN}$) to output the output voltage ($V_{OUT}$) having the magnitude that is less than the maximum output voltage ($V_{out\_max}$) comprises:
   comparing the input voltage ($V_{IN}$) to an upper voltage plateau threshold ($V_{upper\_thresh}$), the upper voltage plateau threshold ($V_{upper\_thresh}$) is greater than the input voltage threshold ($V_{in\_thresh}$); and
   when the input voltage ($V_{IN}$) exceeds the upper voltage plateau threshold ($V_{upper\_thresh}$), proportionally reducing the input voltage ($V_{IN}$) by a switching DC-DC converter of the voltage regulator to generate the output voltage ($V_{OUT}$) that does not violate the maximum output voltage ($V_{out\_max}$).

14. The method of claim 13, further comprising, when the input voltage exceeds the input voltage threshold ($V_{in\_thresh}$) and does not exceed the upper voltage plateau threshold ($V_{upper\_thresh}$), reducing the input voltage ($V_{IN}$) by a linear DC-DC converter to deliver a constant predetermined output voltage ($V_{OUT}$) that does not violate the maximum output voltage ($V_{out\_max}$).

15. The method of any one of claims 11 and 12, wherein the electrical components of the hearing aid device comprise at least one of a microphone, a signal processor, an audio amplifier, related electrical circuitry, and a loudspeaker.

16. The method of any one of claims 11 and 12, wherein the reduced voltage battery comprises a zinc-air battery.

17. The method of any one of claims 11 and 12, wherein the reduced voltage battery comprises a nickel-metal hydride (NiMH) battery.

18. The method of any one of claims 11 and 12, wherein the increased voltage battery comprises a rechargeable silver-zinc battery.

19. The method of any one of claims 11 and 12, further comprising bypassing the voltage regulator when the magnitude of the input voltage ($V_{IN}$) is not greater than the input voltage threshold ($V_{in\_thresh}$).

* * * * *